(12) United States Patent
Nishida et al.

(10) Patent No.: US 6,521,379 B2
(45) Date of Patent: Feb. 18, 2003

(54) NON-AQUEOUS ELECTROLYTE SECONDARY CELL WITH A LITHIUM COBALT OXIDE POSITIVE ELECTRODE

(75) Inventors: Nobumichi Nishida, Tokushima (JP); Takuya Morimoto, Tokushima (JP); Masatoshi Takahashi, Tokushima (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/782,086

(22) Filed: Feb. 14, 2001

(65) Prior Publication Data

US 2001/0036578 A1 Nov. 1, 2001

(30) Foreign Application Priority Data

Mar. 31, 2000 (JP) .......................... 2000-099616

(51) Int. Cl.[7] .................................. H01M 4/52
(52) U.S. Cl. ..................................... 429/231.3
(58) Field of Search ...................... 429/231.3

(56) References Cited

U.S. PATENT DOCUMENTS

| 5,955,051 | A | 9/1999 | Li et al. | 423/594 |
| 6,007,947 | A | * 12/1999 | Mayer | 429/231.1 |

FOREIGN PATENT DOCUMENTS

| EP | 0 421 421 A1 | 4/1991 | |
| JP | 10-001316 | * 1/1998 | H01M/4/04 |
| JP | 9-123614 | * 11/1998 | H01M/4/58 |
| JP | 2001-143705 | * 6/2001 | H01M/4/02 |
| JP | 2001-169636 | * 12/2001 | H01M/10/40 |
| WO | WO 01 27032 A | 4/2001 | |

OTHER PUBLICATIONS

N. Li, et al.; "Electrocatalytic activities of $LiCo_{1-y}M_yO_2$ (M=Ni or Fe) synthesized at low temperature and acid--delithiated products for oxygen evolution/reduction in alkaline solution"; Electrochimica Acta, Elsevier Science Publishers; vol. 46, No. 5, Jan. 1, 2001, pp. 717–722.

* cited by examiner

Primary Examiner—Patrick Ryan
Assistant Examiner—Mark Ruthkosky
(74) Attorney, Agent, or Firm—Armstrong, Westerman & Hattori, LLP (57) ABSTRACT

In a non-aqueous electrolyte secondary cell having a positive electrode mainly composed of a positive electrode active material, a negative electrode, and a non-aqueous electrolyte, the positive electrode active material includes a lithium-containing transition metal complex oxide represented with hexagonal structure by the general formula $LiCo_{1-x}M_xO_2$, wherein M is at least one element selected from the group consisting of V, Cr, Fe, Mn, Ni, Al, and Ti, and a crystallite size (110) of the lithium-containing transition metal complex oxide is greater than 1000 Å. Thereby, the thermal stability of the positive electrode active material is increased, and the discharge characteristic and the charge-discharge characteristic of the cell are improved.

8 Claims, 6 Drawing Sheets

NON-AQUEOUS ELECTROLYTE SECONDARY CELL WITH A LITHIUM COBALT OXIDE POSITIVE ELECTRODE

BACKGROUND OF THE INVENTION

1. Field of the Invention

The present invention relates to a non-aqueous electrolyte secondary cell having a positive electrode composed mainly of a positive electrode active material, a negative electrode, and a non-aqueous electrolyte.

2 Description of the Prior Art

In recent years, non-aqueous electrolyte cells have become the focus of considerable attention as a type of cell that can achieve high capacity. Non-aqueous electrolyte cells typically employ a lithium-containing complex oxide such as lithium cobalt oxide as a positive electrode material, and a material capable of reversibly absorbing and desorbing lithium ions such as a lithium-aluminum alloy, a carbon material, and the like as a negative electrode material.

It is known that the lithium cobalt oxide deteriorates as charge-discharge cycles are repeated. The degree of the deterioration is related to the crystallinity of the lithium cobalt oxide, and the deterioration of the structure caused by charge-discharge operations is more noticeably exhibited when the crystallinity of the lithium cobalt oxide is low. When the crystallinity of the lithium cobalt oxide is low, the lithium cobalt oxide tends to be easily decomposed at charge state and therefore the desorption of oxygen in the active material occurs more easily, which causes degradation in the thermal stability of the cell.

In view of the problem, it may be possible that the crystallite size of the lithium cobalt oxide is increased to improve the crystallinity of the lithium cobalt oxide. However, this technique has a problem such that merely increasing the crystallite size of the lithium cobalt oxide causes a decrease in the diffusion rate of lithium and thereby the degradation in the discharge characteristic.

Another technique for obviating the problem that has been proposed is such that a portion of cobalt in the lithium cobalt oxide in a cell is replaced by another element to improve the discharge characteristic. However, when a portion of the cobalt is replaced by another element, the crystal growth is hindered and consequently the crystallite size becomes small, which causes degradation in thermal stability at charge state.

For these reasons, it has not been feasible to construct a cell that can satisfy sufficient cycle life characteristic, thermal stability, and discharge characteristic, all of which are fundamental characteristics required for a cell.

SUMMARY OF THE INVENTION

In view of the foregoing and other problems of the prior art, it is an object of the present invention to provide a non-aqueous electrolyte secondary cell capable of increasing thermal stability of the positive electrode active material and of improving the discharge characteristic and charge-discharge cycle characteristic of the cell.

This and other objects are accomplished in accordance with the present invention by providing a non-aqueous electrolyte secondary cell comprising:

a positive electrode mainly composed of a positive electrode active material;

a negative electrode; and a non-aqueous electrolyte;

wherein:

the positive electrode active material comprises a lithium-containing transition metal complex oxide with hexagonal structure represented by the general formula $LiCo_{1-x}M_xO_2$, wherein M is at least one element selected from the group consisting of V, Cr, Fe, Mn, Ni, Al, and Ti, and a crystallite size of the lithium-containing transition metal complex oxide with respect to a (110) direction is greater than 1000 Å.

The lithium-containing transition metal complex oxide in which the crystallite size is more than 1000 Å has a high crystallinity. Therefore, the deterioration of the lithium-containing transition metal complex oxide caused by charge-discharge cycling is prevented, and the lithium-containing transition metal complex oxide is not easily decomposed during charge. Consequently, the desorption of oxygen in the active material is suppressed, and the thermal stability of the cell is thereby improved. In addition, because of the addition of the element M, the ionic conductivity of the positive electrode active material increases, which leads to an improvement in the discharge characteristic even when the crystallite size is large.

In addition, M in the general formula $LiCo_{1-x}M_xO_2$ may be at least one element selected from the group consisting of Cr, Mn, Al, and Ti.

According to the above constitution of the invention, the ionic conductivity of the positive electrode active material is further increased, and thereby the discharge characteristic is further improved.

In addition, the value X in the general formula $LiCo_{1-x}M_xO_2$ may be within the range of from 0.0001 to 0.005.

The reason why the value X is thus restricted is as follows. On one hand, if the value X is less than 0.0001, the advantageous effect caused by adding the element M cannot be sufficiently exhibited, and therefore the ionic conductivity of the positive electrode active material cannot be sufficiently increased and the discharge characteristic cannot be improved to a sufficient degree either. On the other hand, if the value X exceeds 0.005, the relative amount of cobalt reduces, which causes a decrease in the capacity of the positive electrode active material. In addition, the lithium-containing transition metal complex oxide may be made from an oxide of cobalt having a specific surface area of 1 $m^2/g$ or larger or a cobalt-containing complex oxide having a specific surface area of 1 $m^2/g$ or larger.

The oxide of cobalt or the cobalt-containing complex oxide having a large specific surface area (having a specific surface area of 1 $m^2/g$ or larger) has a high reactivity, and therefore, the resulting lithium-containing transition metal complex oxide, which is produced by mixing the oxide with a lithium source such as lithium carbonate and then calcining the mixture, exhibits a high crystallinity. In addition, since these oxides has a high reactivity, the degradation of the crystallinity is suppressed even when the element M is added.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Embodiment I

Example A1

Figure 1:
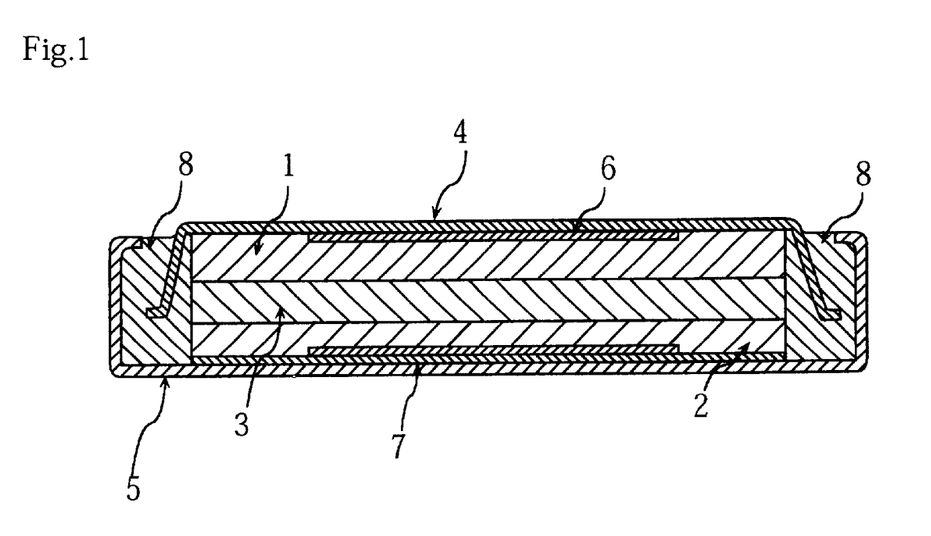
FIG. 1 is a cross-sectional view showing a non-aqueous electrolyte secondary cell in accordance with the present invention.

Now, referring to FIG. 1, an example of the present invention is detailed below. FIG. 1 shows a cross-sectional view of a non-aqueous electrolyte secondary cell in accordance with the present invention.

Preparation of positive electrode

As for the starting materials, lithium carbonate ($Li_2CO_3$) was employed for the lithium source and $(Co_{0.999}V_{0.001})_3O_4$, in which tricobalt tetraoxide was complexed with vanadium V, was employed for the cobalt source. The substance in which tricobalt tetraoxide was complexed with vanadium was obtained in the following manner; cobalt and vanadium solved in an acid solution were precipitated to form a complex hydroxide, and the precipitated substance was calcined at 300° C. The substance in which tricobalt tetraoxide was complexed with vanadium had a specific surface area of 8.46 $m^2/g$. Thereafter, the lithium carbonate and the substance in which tricobalt tetraoxide was complexed with vanadium were weighed so that the molar ratio of Li/(Co+V) was 1, then mixed in a mortar, and press-formed at a pressure of 115 $kg/cm^2$ with the use of a metal mold having a diameter of 17 mm. The resulting substance was calcined at 900° C. in an air atmosphere to obtain a calcined substance, $LiCo_{0.999}V_{0.001}O_2$. The calcined substance was pulverized a mortar so that the pulverized substance has an average particle size of 10 μm. A positive electrode active material was thus prepared.

The composition of the positive electrode active material was analyzed by ICP (inductively coupled plasma spectrometry). The crystal structure was confirmed by XRD (X-ray diffraction) measurement, and the crystallite size was calculated using the Scherrer formula. As a result, it was confirmed that the active material was a lithium-containing transition metal complex oxide with hexagonal structure, and the crystallite size (110) (crystallite size with respect to the (110) direction) was 1010 Å.

Next, 85 parts by weight of the positive electrode active material $LiCo_{0.999}V_{0.001}O_2$ powder, 10 parts by weight of carbon powder serving as an electrical conductivity enhancer, 5 parts by weight of polyvinylidene fluoride serving as a binder were mixed, and then mixed with N-methylpyrrolidone (NMP). Thus, a slurry was prepared. Then, by using a doctor blade method, the slurry was applied onto one side of a current collector made of aluminum and having a thickness of 20 μm so as to form an active material layer, and then dried at 150° C. The current collector with the active material layer was then punched out, and a positive electrode having a disk-like shape with a diameter of 10 mm and a thickness of approximately 80 μm was prepared.

Preparation of negative electrode

First, 95 parts by weight of natural graphite powder and 5 parts by weight of polyvinylidene fluoride were mixed, and the mixture was mixed with an NMP solution to prepare a slurry. Then, by using a doctor blade method, the slurry was applied onto one side of a current collector made of copper and having a thickness of 20 μm so as to form an active material layer, and then dried at 150° C. The current collector having the active material layer thereon was then punched out, and a negative electrode having a disk-like shape with a diameter of 10 mm and a thickness of approximately 60 μm was thus prepared.

Preparation of electrolyte solution $LiPF_6$ was dissolved at a rate of 1 mol/liter in a mixed solvent in which equal volumes of ethylene carbonate and diethyl carbonate are mixed. An electrolyte solution was thus prepared.

Preparation of cell

Using the positive electrode, the negative electrode, and the non-aqueous electrolyte solution, all of which were prepared in the above-described manner, a coin (button) type lithium secondary cell was prepared.

FIG. 1 shows a schematic cross-sectional view of the prepared non-aqueous electrolyte secondary cell. The non-aqueous electrolyte secondary cell comprises a positive electrode 1, a negative electrode 2, a separator 3 that separates the electrodes 1 and 2, a positive can 4, a negative can 5, a positive electrode current collector 6, a negative electrode current collector 7, and an insulating packing 8 made of polypropylene.

The positive electrode 1 and the negative electrode 2 are opposed to each other so as to sandwich the separator 3 therebetween. These are enclosed in a cell case formed by the positive can 4 and the negative can 5. The positive electrode 1 is connected to the positive can 4 via the positive electrode current collector 6, and the negative electrode 2 to the negative can 5 via the negative electrode current collector 7, so as to form a construction that can be charged and discharged, serving as a secondary cell.

When the positive electrode was prepared, the crystallite size of the positive electrode active material was controlled by adjusting a specific surface area of tricobalt tetraoxide. It is considered that the reason why the crystallite size of the positive electrode active material can be controlled by adjusting a specific surface area of tricobalt tetraoxide is that the specific surface area of the material, tricobalt tetraoxide, affects the reactivity with lithium carbonate, and thereby the degree of the crystal growth can be varied. According to an experiment carried out by the present inventors, it was confirmed that when the specific surface area of the tricobalt tetraoxide is 1 $m^2/g$ or larger, a positive electrode active material having a crystallite size of 1000 Å or larger can be obtained, but when the specific surface area of the tricobalt tetraoxide is about 0.5 $m^2/g$ to 0.9 $m^2/g$, the positive electrode active material having a crystallite size of 1000 Å or larger cannot be obtained.

A cell thus prepared is hereinafter referred to as a cell A1 in accordance with the present invention.

Examples A2–A9

A plurality of cells were produced following the procedure set forth in Example A1 above except that when the positive electrode for each cell was prepared, tricobalt tetraoxide complexed with Cr, Fe, Mn, Ni, Al, or Ti was employed in place of V as the element M and in addition the specific surface area of the tricobalt tetraoxide was varied in each cell so as to be 1 $m^2/g$ or larger. The specific surface area of tricobalt tetraoxide was varied by varying the temperature at which the substance was calcined. Specifically, when the calcining temperature was increased, the specific surface area was reduced, whereas when the calcining temperature was decreased, the specific surface area was increased.

The cells thus prepared are hereinafter referred to as cells A2 to A9 of the present invention.

Comparative Examples X1–X11

A plurality of cells were produced following the procedure set forth in Example A1 above except that when the positive electrode for each cell was prepared, the specific surface area of the tricobalt tetraoxide was varied in each cell within the range of from 0.5 to 0.9 m²/g so that the crystallite size (110) was made smaller than 1000 Å in the positive electrode active material. The specific surface area of tricobalt tetraoxide was varied by varying the temperature of the calcining the substance. Specifically, the temperature of the calcining was increased and the specific surface area was thereby reduced.

The cells thus produced are hereinafter referred to as comparative cells X1 to X11.

Comparative Examples X12–X17

A plurality of cells were produced following the procedure set forth in Example A1 above except that when the positive electrode for each cell was prepared, tricobalt tetraoxide was not complexed with the element M and the specific surface area of the tricobalt tetraoxide was varied in each cell.

The cells thus produced are hereinafter referred to as comparative cells X12 to X17.

Experiment A-1

Figure 2:
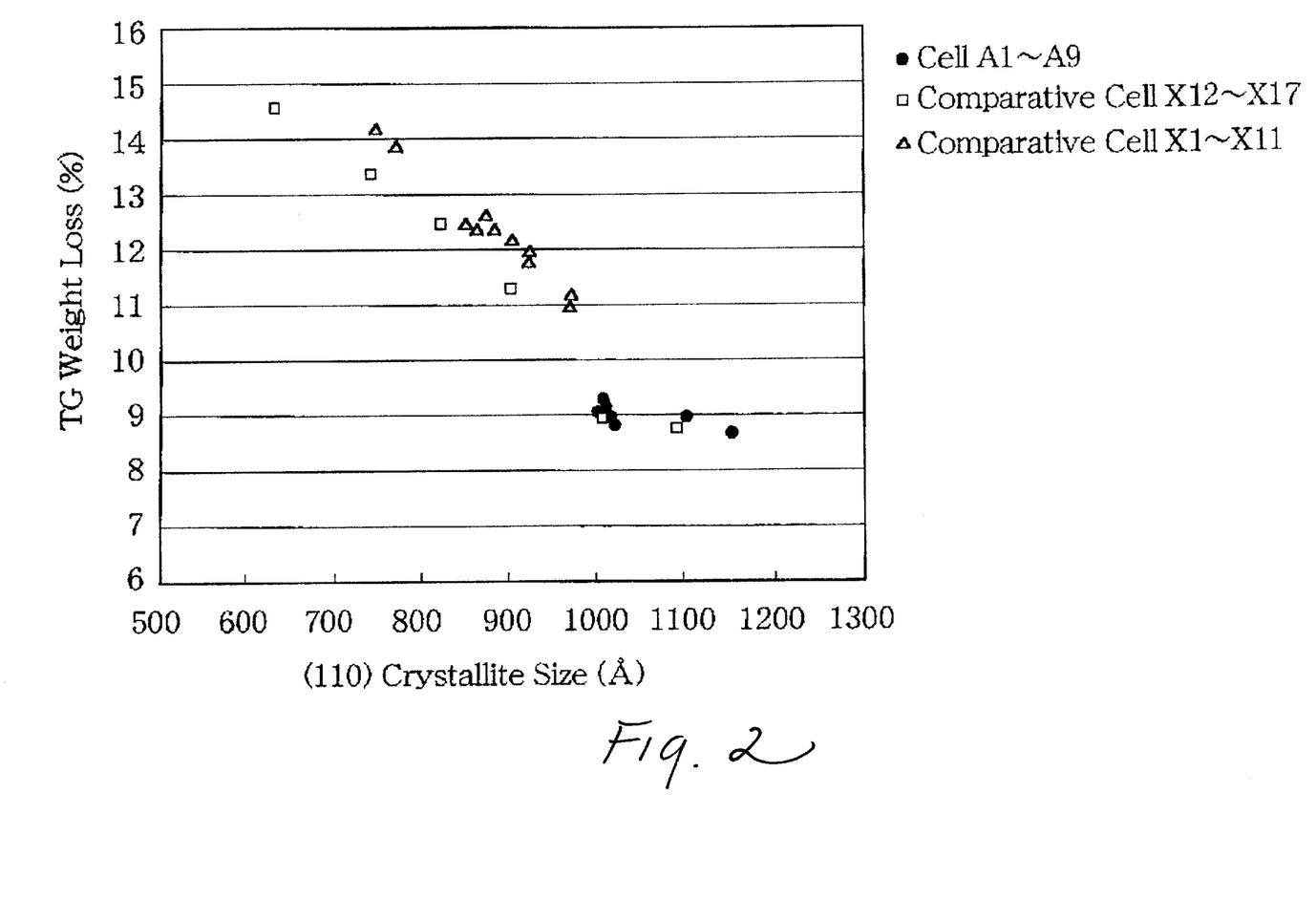
FIG. 2 is a graph illustrating the relationship between crystallite sizes and thermal stability.

Each of the cells A1 to A9 and the comparative cells X1 to X17 was charged up to 4.2 V at a current of 100 μA at 25° C., and thereafter disassembled in a dry box, rinsed with dimethyl carbonate, and vacuum-dried, in order to prepare samples. Each sample was heated from room temperature to 300° C. at a rate of 5° C./min., and the weight change was measured by thermogravimetric (TG). The results are shown in Table 1 below and FIG. 2.

of the present invention and the comparative cells X12 and X13, the weight loss determined by TG in each cell was 10% or lower, which was remarkably small. By contrast, when the crystallite size was less than 1000 Å as in the comparative cells X1 to X11 and X14 to X17, the weight loss determined by TG in each cell exceeded 10%, which was very large. The weight loss determined by TG indicates the desorption of oxygen in the active material. Therefore, it is considered that when the weight loss is small (when the amount of the desorbed oxygen is small), the thermal stability of the active material is good, whereas when the weight loss is large (when the amount of the desorbed oxygen is large), the thermal stability of the active material is poor.

Hence, the cells A1 to A9 of the present invention and the comparative cells X12 and X13, in which the crystallite size exceeds 1000 Å, have stable crystal structure, and therefore, in these cells, the amount of desorbed oxygen is small and the thermal stability of the active material is good. By contrast, the comparative cells X1 to X11 and X14 to X17 have unstable crystal structure, and therefore in these cells, the amount of desorbed oxygen is large and the thermal stability of the active material is poor.

Experiment A-2

Using the cells A1 to A9 and comparative cells X1 to X17, average discharge voltages of the cells were measured while the cells were fully charged and thereafter discharged at 100 μA. The results are shown in Table 1 above and FIG. 3.

Figure 3:
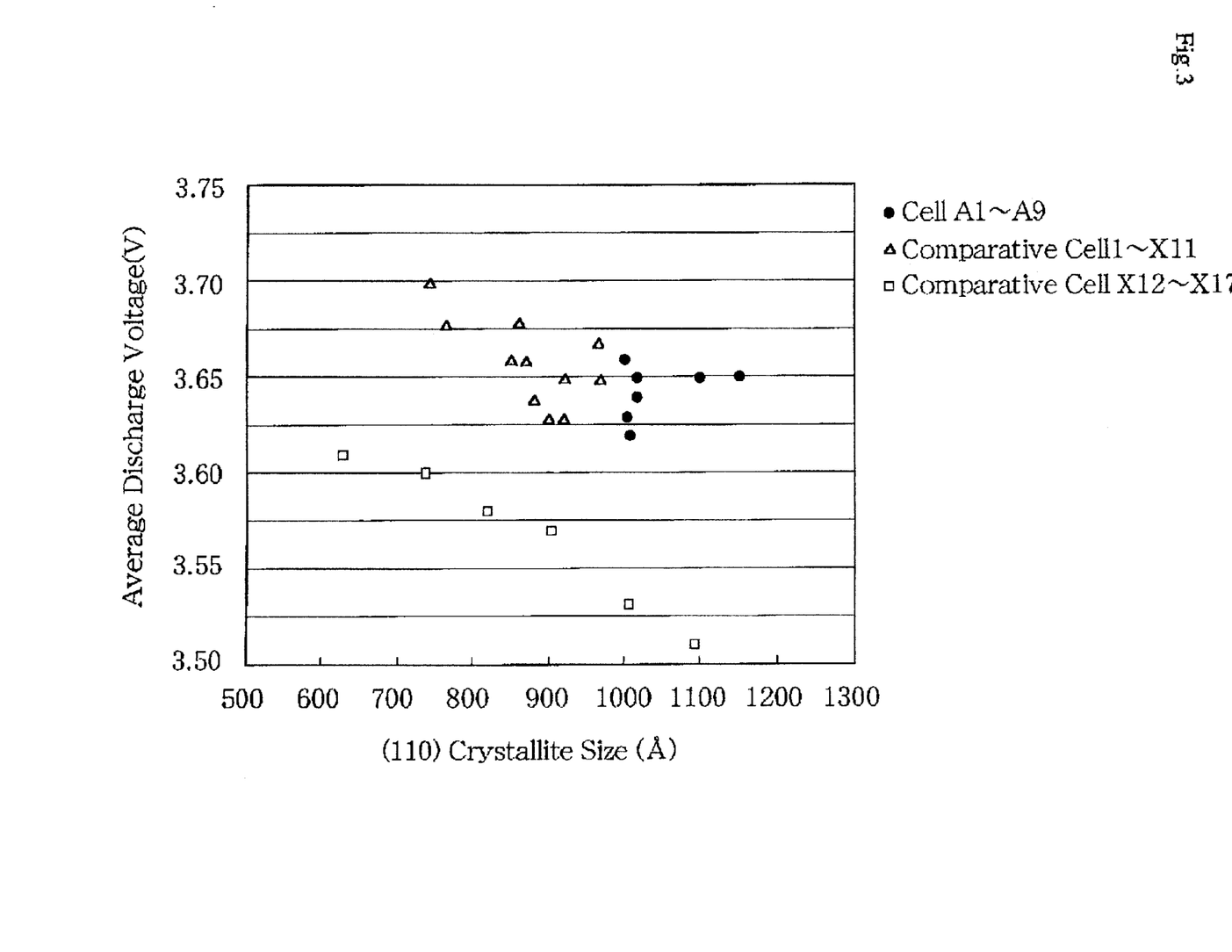
FIG. 3 is a graph illustrating the relationship between crystallite sizes and discharge characteristic.

As apparent from Table 1 and FIG. 3, the comparative cells X12 to X17, in which other elements were not added, showed low average discharge voltages, and the larger the

TABLE 1

| Cell | Composition of Positive Electrode Active Material | (110) Crystallite size (Å) | TG weight loss (%) | Average discharge voltage (V) | Capacity retention rate (%) |
|---|---|---|---|---|---|
| A1 | $LiCo_{0.999}V_{0.001}O_2$ | 1010 | 9.2 | 3.62 | 82 |
| A2 | $LiCo_{0.999}Cr_{0.001}O_2$ | 1015 | 9.0 | 3.65 | 82 |
| A3 | $LiCo_{0.999}Fe_{0.001}O_2$ | 1005 | 9.1 | 3.63 | 82 |
| A4 | $LiCo_{0.999}Mn_{0.001}O_2$ | 1020 | 8.8 | 3.65 | 84 |
| A5 | $LiCo_{0.999}Ni_{0.001}O_2$ | 1006 | 9.3 | 3.62 | 83 |
| A6 | $LiCo_{0.999}Al_{0.001}O_2$ | 1020 | 8.9 | 3.64 | 83 |
| A7 | $LiCo_{0.999}Al_{0.001}O_2$ | 1150 | 8.7 | 3.65 | 84 |
| A8 | $LiCo_{0.999}Ti_{0.001}O_2$ | 1012 | 9.0 | 3.66 | 84 |
| A9 | $LiCo_{0.999}Ti_{0.001}O_2$ | 1100 | 9.0 | 3.65 | 83 |
| X1 | $LiCo_{0.999}V_{0.001}O_2$ | 900 | 12.2 | 3.63 | 80 |
| X2 | $LiCo_{0.999}Cr_{0.001}O_2$ | 920 | 11.8 | 3.65 | 81 |
| X3 | $LiCo_{0.999}Fe_{0.001}O_2$ | 880 | 12.4 | 3.64 | 80 |
| X4 | $LiCo_{0.999}Mn_{0.001}O_2$ | 870 | 12.7 | 3.66 | 80 |
| X5 | $LiCo_{0.999}Ni_{0.001}O_2$ | 920 | 12.0 | 3.63 | 81 |
| X6 | $LiCo_{0.999}Al_{0.001}O_2$ | 970 | 11.2 | 3.65 | 80 |
| X7 | $LiCo_{0.999}Al_{0.001}O_2$ | 850 | 12.5 | 3.66 | 81 |
| X8 | $LiCo_{0.999}Al_{0.001}O_2$ | 769 | 13.9 | 3.68 | 80 |
| X9 | $LiCo_{0.999}Ti_{0.001}O_2$ | 968 | 11.0 | 3.67 | 82 |
| X10 | $LiCo_{0.999}Ti_{0.001}O_2$ | 860 | 12.4 | 3.68 | 82 |
| X11 | $LiCo_{0.999}Ti_{0.001}O_2$ | 744 | 14.2 | 3.70 | 83 |
| X12 | $LiCoO_2$ | 1090 | 8.8 | 3.51 | 75 |
| X13 | $LiCoO_2$ | 1005 | 9.0 | 3.53 | 78 |
| X14 | $LiCoO_2$ | 900 | 11.3 | 3.57 | 80 |
| X15 | $LiCoO_2$ | 820 | 12.5 | 3.58 | 81 |
| X16 | $LiCoO_2$ | 740 | 13.4 | 3.60 | 80 |
| X17 | $LiCoO_2$ | 630 | 14.6 | 3.61 | 78 |

As apparent from Table 1 above and FIG. 2, when the crystallite size of the positive electrode active material with respect to the (110) direction (hereafter abbreviated as "crystallite size") exceeded 1000 Å as in the cells A1 to A9 crystallite sizes were, the lower the average discharge voltages. When the crystallite sizes were larger than 1000 Å, the resulting average discharge voltages were especially low, which indicates that in these cases, the discharge characteristic was very poor. By contrast, the cells A1 to A9 and the comparative cells X1 to X11, in which other elements were added, exhibited the increases in the average discharge voltages, which indicates that the discharge characteristic was improved. In the cases where other elements were added, almost the same average discharge voltages as those of the comparative cells X1 to X11, in which the crystallite sizes were 1000 Å or smaller, were obtained even in the cases where the crystallite sizes exceeded 1000 Å as in the cells A1 to A9 of the present invention. The cells employing Cr, Mn, Al, or Ti as another element exhibited especially favorable discharge characteristic.

As described above, the cells A1 to A9 of the present invention exhibit good discharge characteristic although they have crystallite sizes greater than 1000 Å with respect to the (110) direction, in which direction the lithium ions are diffused during charge and discharge operations. This is thought to be due to the fact that if another element is included as in the cells A1 to A9 of the present invention, the ionic conductivity of the positive electrode active material improves because of the presence of the metal. Also, the discharge characteristics vary depending on the kinds of other elements. The reason is thought to be that the stable atomic valence numbers of the other elements are involved therein.

Experiment A-3

Using the cells A1 to A9 and the comparative cells X1 to X17, a capacity retention rate of each of the cells was measured. For each cell, the following charge-discharge cycle was repeated 100 times: each of the cells was charged at a current value of 100 µA at 25° C. until the voltage became 4.2 V, and thereafter discharged at 100 µA until the voltage became 2.75 V. The results are shown in Table 1 above and FIG. 4. It is noted that the term "capacity retention rate" means a value obtained by the following equation:

Capacity retention rate=discharge capacity at the 100th cycle/discharge capacity at the first cycle×100 (%).

Figure 4:
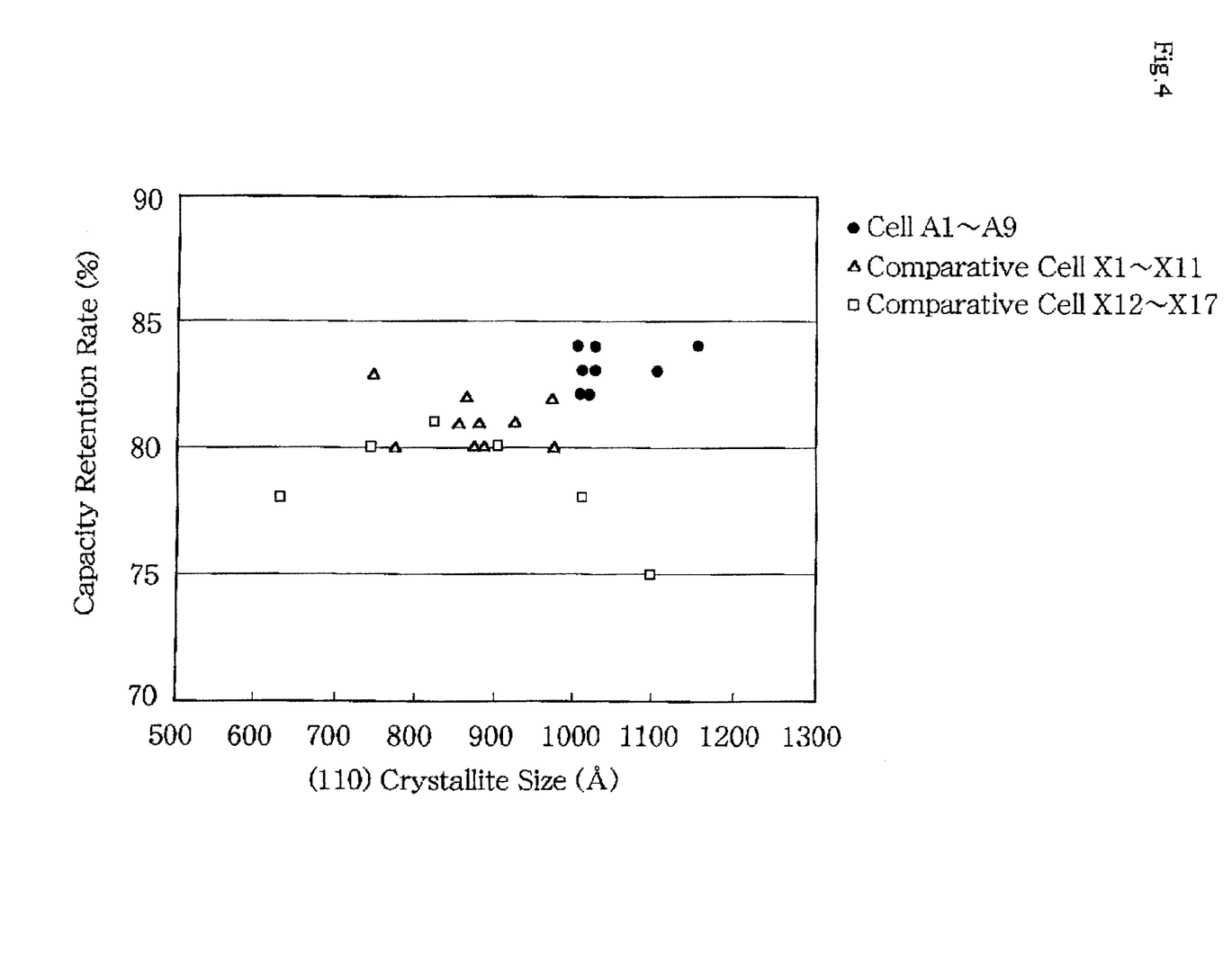
FIG. 4 is a graph illustrating the relationship between crystallite sizes and cycle characteristic.

As apparent from Table 1 and FIG. 4, of the comparative cells X12 to X17 not employing another element, the comparative cells X12 and X13, in which the crystallite sizes were greater than 1000 Å, showed a capacity retention rate of less than 80%, which indicates that the cycle characteristic was poor. On the other hand, the cells A1 to A9 and the comparative cells X1 to X11, in which another element was included, exhibited a capacity retention rate of 80% or greater, which indicates that the cycle characteristic was improved. Further, in the cases where another element was employed, it was confirmed that the capacity retention rates of the cells A1 to A9, in which the crystallite size were greater than 1000 Å, were approximately the same as those of the comparative cells X1 to X11, in which the crystallite size is lower than 1000 Å.

From the results of the experiments A-1 to A-3 above, it is understood that in order to increase the thermal stability of the positive electrode active material and thereby improve discharge characteristic and charge-discharge cycle characteristic of a cell, it is effective to employ a positive electrode active material comprising a lithium-containing transition metal complex oxide with hexagonal structure represented by the general formula $LiCo_{1-x}M_xO_2$, wherein M is at least one element selected from the group consisting of V, Cr, Fe, Mn, Ni, Al, and Ti, and a crystallite size of the lithium-containing transition metal complex oxide with respect to the (110) direction is greater than 1000 Å.

Embodiment II

In Embodiment II, the amounts of elements M to be added were varied, and initial capacities, discharge characteristics, and cycle life characteristics were examined.

Examples B1–B8

A plurality of cells were produced following the procedure set forth in Example A2 in Embodiment I above except that the amount of Cr to be added (the value X in $LiCo_{1-x}Cr_xO_2$) was varied.

The cells thus produced are hereinafter referred to as cells B1 to B8 of the present invention.

Examples B9–B16

A plurality of cells were produced following the procedure set forth in Example A4 in Embodiment I above except that the amount of Mn to be added (the value X in $LiCo_{1-x}Mn_xO_2$) was varied.

The cells thus produced are hereinafter referred to as cells B9 to B16 of the present invention.

Examples B17–B24

A plurality of cells were produced following the procedure set forth in Example A6 in Embodiment I above except that the amount of Al to be added (the value X in $LiCo_{1-x}Al_xO_2$) was varied.

The cells thus produced are hereinafter referred to as cells B17 to B24 of the present invention.

Examples B25–B32

A plurality of cells were produced following the procedure set forth in Example A8 in Embodiment I above except that the amount of Ti to be added (the value X in $LiCo_{1-x}Ti_xO_2$) was varied.

The cells thus produced are hereinafter referred to as cells B25 to B32 of the present invention.

Experiment B-1

Using the cells B1 to B32 of the invention, charge-discharge operation was performed only once under the same conditions in Experiment A-3 in the foregoing Embodiment I and an initial capacity (initial discharge capacity) of each cell was measured. The results are shown in Table 2 below. Table 2 also shows the results of the cells of the invention A2, A4, A6, and A8.

TABLE 2

| Cell | Element added | Amount of element to be added | Initial capacity (mAh/g) | Average discharge voltage (V) | Capacity retention rate (%) |
|---|---|---|---|---|---|
| B1 |  | 0.00007 | 148 | 3.55 | 80 |
| B2 |  | 0.0001 | 148 | 3.62 | 82 |
| B3 |  | 0.0003 | 148 | 3.65 | 83 |
| B4 |  | 0.0005 | 148 | 3.66 | 83 |
| B5 | Cr | 0.0007 | 147 | 3.65 | 82 |
| A2 |  | 0.001 | 148 | 3.65 | 82 |
| B6 |  | 0.003 | 147 | 3.66 | 83 |
| B7 |  | 0.005 | 146 | 3.66 | 81 |
| B8 |  | 0.007 | 138 | 3.65 | 76 |
| B9 |  | 0.00007 | 148 | 3.57 | 81 |
| B10 |  | 0.0001 | 148 | 3.66 | 83 |
| B11 |  | 0.0003 | 148 | 3.65 | 83 |

TABLE 2-continued

| Cell | Element added | Amount of element to be added | Initial capacity (mAh/g) | Average discharge voltage (V) | Capacity retention rate (%) |
|---|---|---|---|---|---|
| B12 |  | 0.0005 | 147 | 3.67 | 84 |
| B13 | Mn | 0.0007 | 147 | 3.66 | 84 |
| A4 |  | 0.001 | 147 | 3.65 | 84 |
| B14 |  | 0.003 | 146 | 3.66 | 82 |
| B15 |  | 0.005 | 146 | 3.67 | 82 |
| B16 |  | 0.007 | 136 | 3.67 | 75 |
| B17 |  | 0.00007 | 148 | 3.56 | 79 |
| B18 |  | 0.0001 | 147 | 3.65 | 82 |
| B19 |  | 0.0003 | 147 | 3.65 | 82 |
| B20 |  | 0.0005 | 147 | 3.64 | 83 |
| B21 | Al | 0.0007 | 147 | 3.65 | 83 |
| A6 |  | 0.001 | 147 | 3.64 | 83 |
| B22 |  | 0.003 | 146 | 3.65 | 82 |
| B23 |  | 0.005 | 146 | 3.66 | 82 |
| B24 |  | 0.007 | 135 | 3.65 | 73 |
| B25 |  | 0.00007 | 148 | 3.57 | 80 |
| B26 |  | 0.0001 | 148 | 3.66 | 84 |
| B27 |  | 0.0003 | 148 | 3.66 | 84 |
| B28 |  | 0.0005 | 148 | 3.66 | 85 |
| B29 | Ti | 0.0007 | 148 | 3.67 | 85 |
| A8 |  | 0.001 | 147 | 3.66 | 84 |
| B30 |  | 0.003 | 147 | 3.68 | 85 |
| B31 |  | 0.005 | 147 | 3.67 | 83 |
| B32 |  | 0.007 | 139 | 3.68 | 73 |

As apparent from Table 2, the cells B8, B16, B24, and B32 of the invention, in which the amount of the added element Cr and so forth is 0.007, exhibit small initial capacities per 1 g of the positive electrode active material, 135 to 139 mAh/g. By contrast, the cells of the invention A2, A4, A6, A8, B1 to B7, B9 to B15, B17 to B23, and B25 to B31, in which the amount of the added element Cr and so forth is 0.005 or less, exhibit an initial capacity per 1 g of the positive electrode active material of 146 mAh/g or greater. Therefore, it is understood that in order to prevent the initial capacity from becoming a small value, it is preferable that the amount of Cr and so forth to be added be 0.005 or less. Although not shown in Table 2 above, it was confirmed that the comparative cells X12 to X17 not employing another element showed initial capacities of 147 to 148 mAh/g, which demonstrates that the cells A2, A4, A6, A8, B1 to B7, B9 to B15, B17 to B23, B25 to B31 of the invention are not inferior to the comparative cells X12 to X17 not employing another element.

Experiment B-2

Using the cells B1 to B32 of the invention, charge-discharge operation was performed only once under the same conditions in Experiment A-2 in the foregoing Embodiment I and an average discharge voltage of each cell was measured. The results are shown in Table 2 above and FIG. 5. Table 2 and FIG. 5 also show the results of the cells of the invention A2, A4, A6, and A8.

Figure 5:
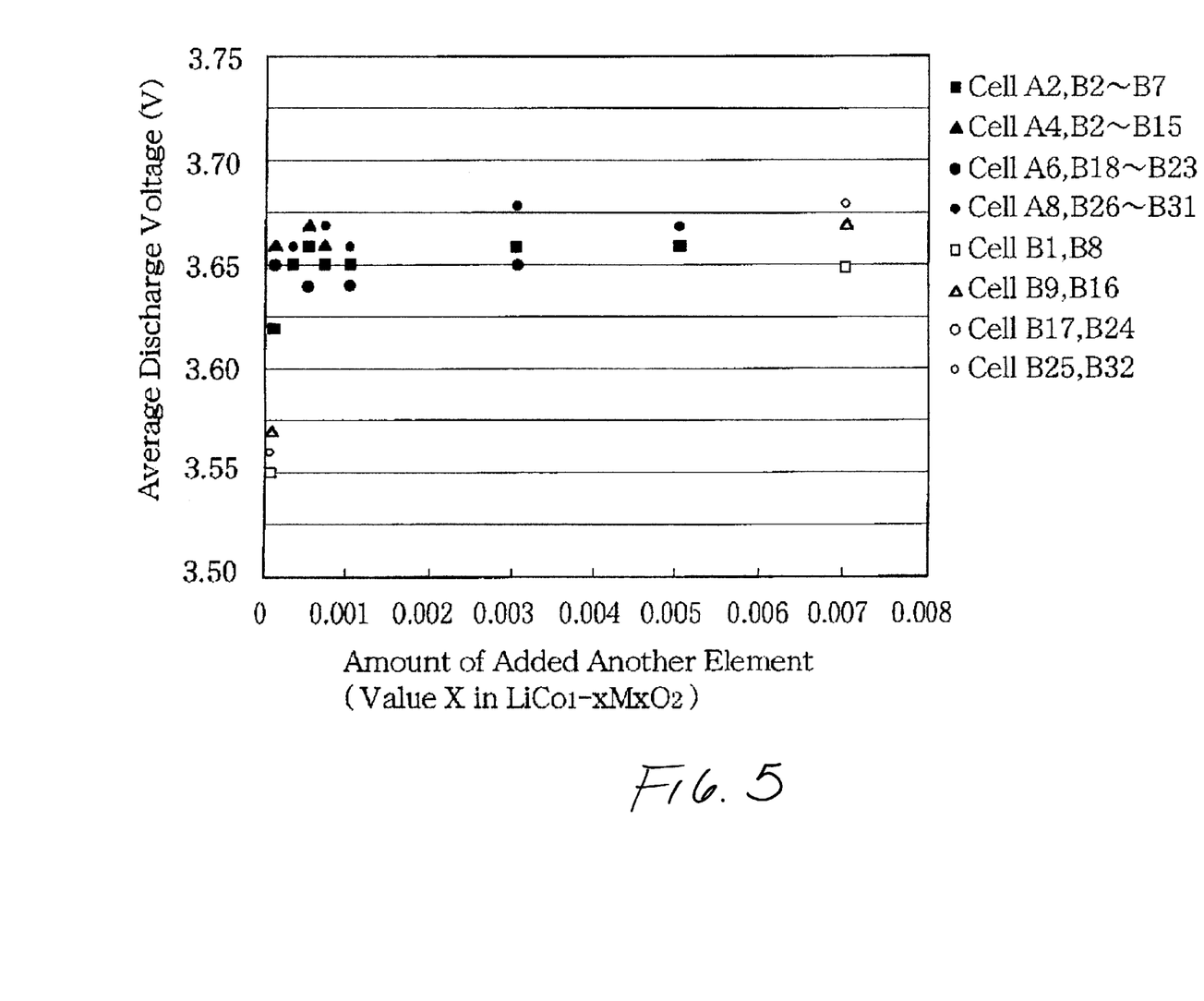
FIG. 5 is a graph illustrating the relationship between the amounts of another element to be added and discharge characteristic.

As apparent from Table 2 above and FIG. 5, the cells B1, B9, B17, and B25 of the present invention, in which the amount of the added element Cr and so forth was 0.00007, showed average discharge voltages of 3.57 V or lower, whereas the cells A2, A4, A6, A8, B2 to B8, B10 to B16, B18 to B24, B26 to B32, in which the amounts of the added element Cr and so forth were 0.0001 or more, exhibited average discharge voltages of 3.62 V or higher. Accordingly, it is understood that in order to increase an average discharge voltage of a cell, it is preferable that the amount of Cr and so forth to be added be 0.0001 or more.

Experiment B-3

The cells B1 to B32 of the present invention were subjected to the charge-discharge cycle under the same conditions in Experiment A-3 in the foregoing Embodiment I. The cycle was repeated 100 times, and a capacity retention rate of each cell was measured. The results are shown in Table 2 above and FIG. 6. Table 2 and FIG. 6 also show the results of the cells of the invention A2, A4, A6, and A8.

Figure 6:
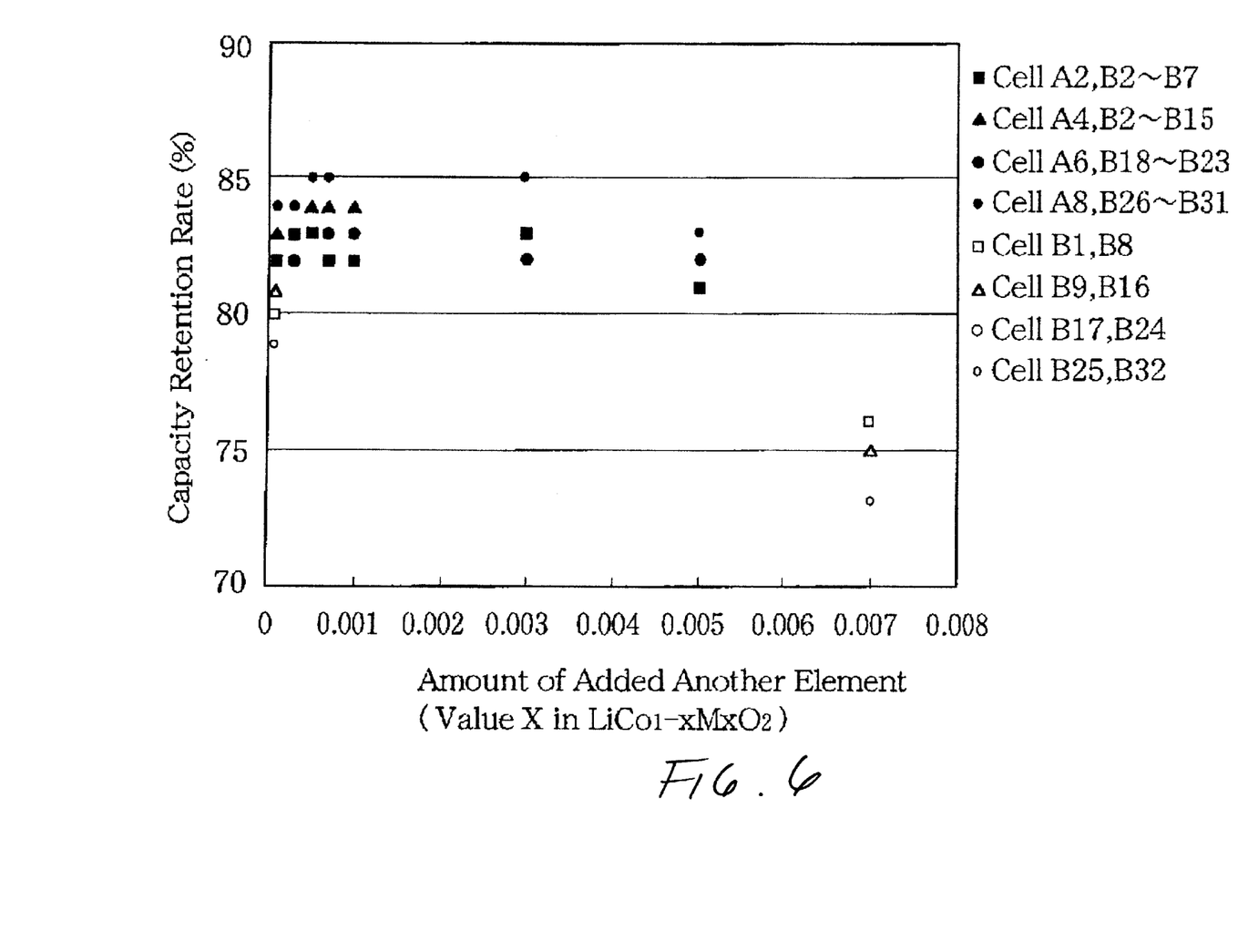
FIG. 6 is a graph illustrating the relationship between the amounts of another element to be added and cycle characteristic

As apparent from Table 2 and FIG. 6, the cells B8, B16, B24, B32 of the invention, in which the amount of the added element Cr and so forth was 0.007, showed capacity retention rates of 76% or less, and the cells B1, B9, B17, and B25 of the invention, in which the amount of the added element Cr and so forth was 0.00007, showed capacity retention rates of approximately 80%. By contrast, the cells A2, A4, A6, A8, B2 to B7, B10 to B15, B18 to B23, and B26 to B31, in which the amounts of the added element Cr and so forth were from 0.0001 to 0.005, exhibited capacity retention rates of 81% or greater, which were superior to the values of the foregoing cells.

The present inventors also confirmed that the cells B1 to B32 showed weight losses determined by TG measurement of from 8.7 to 9.3%, which demonstrates that these cells have good thermal stability, although the values are not shown in Table 2.

From the results discussed above, it is understood that in order to increase the thermal stability of the positive electrode active material and simultaneously improve the discharge characteristic and charge-discharge cycle characteristic, it is preferable that the amount of another element to be added be restricted within the range of from 0.0001 to 0.005.

Miscellaneous (1) The adding of the element M is not limited at the stage of the precipitation. For example, the element M may be added in the form of an oxide or the like when tricobalt tetraoxide and lithium carbonate are calcined.

(2) Examples of the materials that can be suitably employed as the material of the negative electrode include lithium metals, lithium alloys, and metal oxides such as tin oxides, in addition to the natural graphite mentioned above. Further, the solvent of the electrolyte solution is not limited to the example shown above, but may be a mixed solvent in which a solution having a relatively high relative dielectric constant is mixed with a low viscosity and low boiling point solvent at an appropriate ratio. Examples of the solution having a relatively high relative dielectric constant include propylene carbonate, vinylene carbonate, and γ-butyrolactone, and examples of the low viscosity and low boiling point solvent include dimethyl carbonate, methyl ethyl carbonate, tetrahydrofuran, 1,2-dimethoxyethane, 1,3-dioxolane, 2-methoxytetrahydrofuran, and diethyl ether. Examples of the electrolytes in the electrolyte solution include $LiAsF_6$, $LiClO_4$, $LiBF_4$, and $LiCF_3SO_3$, in addition to $LiPF_6$ mentioned above.

Although the present invention has been fully described by way of examples, it is to be noted that various changes and modification will be apparent to those skilled in the art. Therefore, unless such changes and modifications depart from the scope of the present invention, they should be construed as being included therein.

What is claimed is:

1. A non-aqueous electrolyte secondary cell comprising:
   a positive electrode mainly composed of a positive electrode active material;
   a negative electrode; and
   a non-aqueous electrolyte;

wherein:

said positive electrode active material comprises a lithium-containing transition metal complex oxide with hexagonal structure represented by the general formula $LiCo_{1-x}M_xO_2$, wherein M is at least one element selected from the group consisting of V, Cr, Fe, Mn, Ni, Al, and Ti, and a crystallite size of said lithium-containing transition metal complex oxide with respect to a (110) direction is greater than 1000 Å.

2. A non-aqueous electrolyte secondary cell according to claim 1, wherein M in the general formula $LiCo_{1-x}M_xO_2$ is at least one element selected from the group consisting of Cr, Mn, Al, and Ti.

3. A non-aqueous electrolyte secondary cell according to claim 1, wherein the value X in the general formula $LiCo_{1-x}M_xO_2$ is within the range of from 0.0001 to 0.005.

4. A non-aqueous electrolyte secondary cell according to claim 2, wherein the value X in the general formula $LiCo_{1-x}M_xO_2$ is within the range of from 0.0001 to 0.005.

5. A non-aqueous electrolyte secondary cell according to claim 1, wherein said lithium-containing transition metal complex oxide is made from an oxide of cobalt having a specific surface area of 1 $m^2/g$ or larger or a cobalt-containing complex oxide having a specific surface area of 1 $m^2/g$ or larger.

6. A non-aqueous electrolyte secondary cell according to claim 2, wherein said lithium-containing transition metal complex oxide is made from an oxide of cobalt having a specific surface area of 1 $m^2/g$ or larger or a cobalt-containing complex oxide having a specific surface area of 1 $m^2/g$ or larger.

7. A non-aqueous electrolyte secondary cell according to claim 3, wherein said lithium-containing transition metal complex oxide is made from an oxide of cobalt having a specific surface area of 1 $m^2/g$ or larger or a cobalt-containing complex oxide having a specific surface area of 1 $m^2/g$ or larger.

8. A non-aqueous electrolyte secondary cell according to claim 4, wherein said lithium-containing transition metal complex oxide is made from an oxide of cobalt having a specific surface area of 1 $m^2/g$ or larger or a cobalt-containing complex oxide having a specific surface area of 1 $m^2/g$ or larger.

* * * * *